June 30, 1925.
J. R. ORWIG
CLIP BAR
Filed March 26, 1923
1,544,169
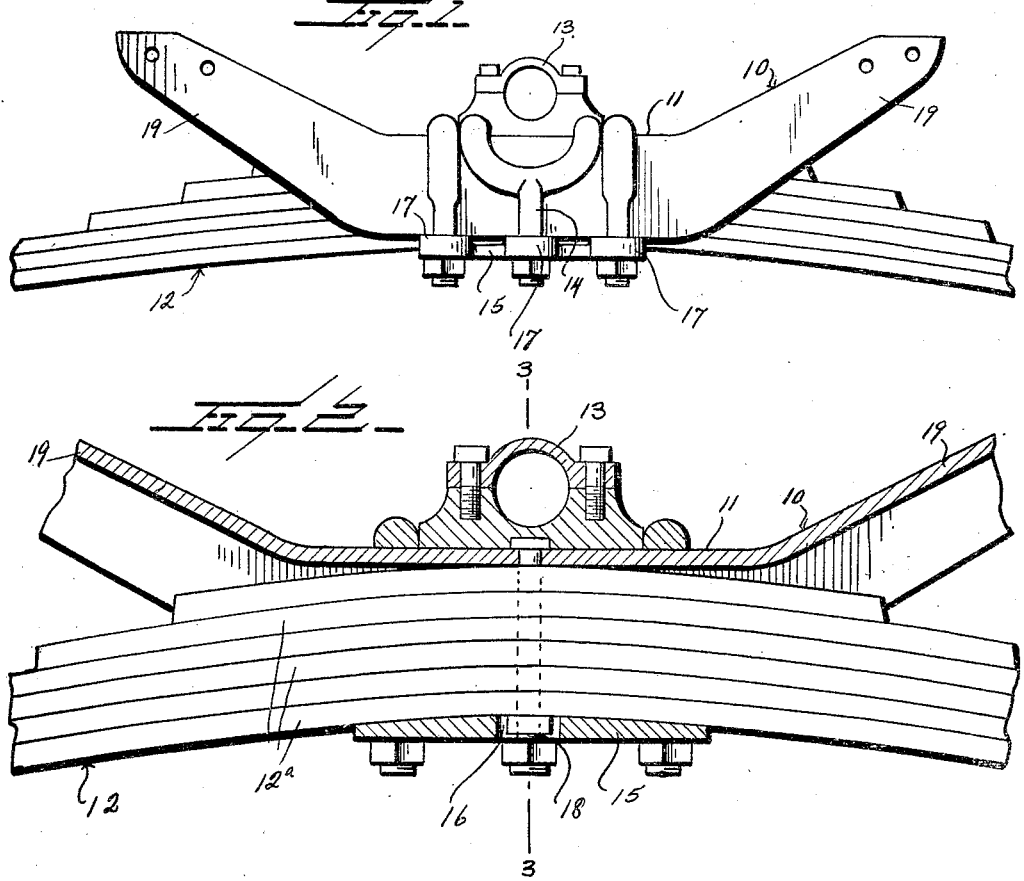
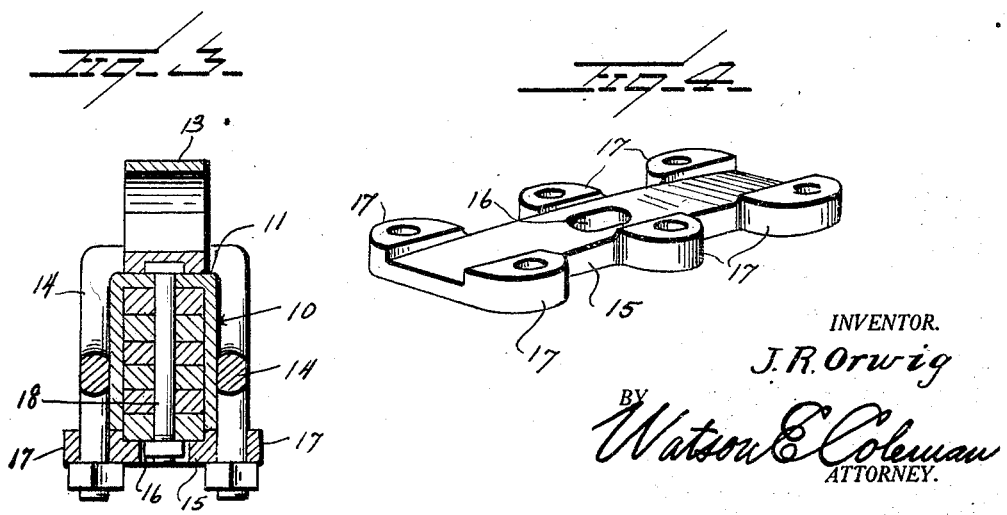
INVENTOR.
J. R. Orwig
BY Watson E. Coleman
ATTORNEY.

Patented June 30, 1925.

1,544,169

UNITED STATES PATENT OFFICE.

JAMES R. ORWIG, OF OKMULGEE, OKLAHOMA.

CLIP BAR.

Application filed March 26, 1923. Serial No. 627,858.

*To all whom it may concern:*

Be it known that I, JAMES R. ORWIG, a citizen of the United States, residing at Okmulgee, in the county of Okmulgee and State of Oklahoma, have invented certain new and useful Improvements in Clip Bars, of which the following is a specification, reference being had to the accompanying drawings.

This invention relates to clip bars and more particularly to a clip bar for attaching a spring to the support thereof.

An important object of the invention is to provide a structure of this character capable of use in attaching the springs of a common form of vehicle, whereby the spring is more firmly seated and held in position and is provided with an increased bearing surface.

A further object of the invention is to provide a device of this character which may be substituted for the ordinary spring mounting without the necessity of removing the spring from its seat.

A still further object of the invention is to provide a device of this character so constructed that it combines with the spring seat to form a housing for the central portion of the spring which prevents spreading of the leaves of the spring.

These and other objects I attain by the construction shown in the accompanying drawings, wherein for the purpose of illustration I have shown a preferred embodiment of my invention and wherein:—

Figure 1 is a front elevation showing a clip bar constructed in accordance with my invention applied to the cross member and the spring of a chassis;

Figure 2 is a longitudinal sectional view through the clip and cross member;

Figure 3 is a section on the line 3—3 of Figure 2;

Figure 4 is a perspective of the clip member detached.

Referring now more particularly to the drawings, the numeral 10 indicates a front cross member of a well known make of vehicle, which is formed of channel iron with the channel thereof downwardly directed and which is provided centrally with a substantially straight portion 11 forming a spring seat for the supporting leave spring 12 and likewise a seat upon its upper surface for a front end bearing 13 of the engine of the vehicle. As is well known to those familiar with the art, in the usual construction of this type of vehicle, as now practiced, the spring is housed within the channel at its central portion and is held in position by a clamping plate which is in turn held positioned by a combined U-bolt and bearing structure, generally indicated at 14, and extending through ears formed on the plate.

In accordance with my invention I provide an attaching plate 15, the upper surface of which is curved to conform to the curvature of the lower surface of the spring and which is provided centrally with an opening 16 receiving the end of the bolt 18 by means of which the leaves of the spring are held in assembled relation. At each side the plate 15 is provided with three ears 17, one of these ears being located centrally at each side of the plate and the remaining ears being arranged adjacent the ends of the plate. These ears project upwardly from the plate a distance equal to the distance between the bottom of the spring when in position within the channel of the channel iron, so that they engage beneath the under surface of the arms of the channel iron. Each ear 17 has openings formed therein for the reception of the arms of U-bolts, one of these U-bolts being of the type illustrated at 14 and the remaining U-bolts being of the usual construction. By tightening up the nuts upon the arms of the U-bolts the ears 17 will have the upper faces thereof forced into engagement with the lower surface of the arms of the channel iron and will combine therewith to form a continuous housing or wall against which the side faces of the leaves 12ᵃ of the spring 12 abut.

This plate is preferably made of a length substantially equalling the length of the relatively straight portion 11 and accordingly the spring leaves are firmly held against such sidewise movement as is ordinarily present. Furthermore, the extreme length of the plate provides a seat for the spring having a bearing surface of approximately double the present structure and this additional bearing surface aids materially in preventing the breakage of the leaves of the springs, occurring as the result of the rebound action of the springs when compressed, due to road shocks. Furthermore, by the use of the structure hereinbefore recited the spring is rigidly connected with the cross member 10 at points in approximate alignment with the upwardly angularly extending portions 19 of this cross member, formed at the ends of the relatively straight portion 11, and a shock applied to the springs is accordingly imparted to these angular portions as well as to the straight central portion upon which in the usual construction the entire stress of a shock falls.

It has been found in practice that this structure greatly decreases breakage of the front cross member and likewise decreases the breakage of the leaves of the spring, resulting from the rebound action above referred to. It will be obvious that the structure hereinbefore recited is capable of some change and modification without materially departing from the spirit of my invention and I accordingly do not limit myself to such specific structure, except as hereinafter claimed.

I claim:

In combination with a front end member of a vehicle frame having a central flattened portion and provided with a channel in its under surface affording a seat for the central portion of a curved leaf spring of a plate curved to conform to the curvature of the under surface of the spring and provided at its side with ears extending outwardly therefrom having their upper surfaces in a plane paralleling the flattened portion of the front end member when the plate proper is engaged with the central portion of the spring, certain of said ears being disposed at the ends of the side edges of the plate and above the plane of the curved portion of the plate lying therebetween the curved portion of the plate being of the same width as the spring and U-bolts straddling the flattened portion of the frame and engaging in said ears for forcing the upper surface of said ears toward the under surface of the arms of the cross member.

In testimony whereof I hereunto affix my signature.

JAMES R. ORWIG.